M. W. McARDLE.
CUTTER FOR ANIMAL SHEARS.
APPLICATION FILED DEC. 1, 1911.
1,019,333.
Patented Mar. 5, 1912.
Fig. 1.
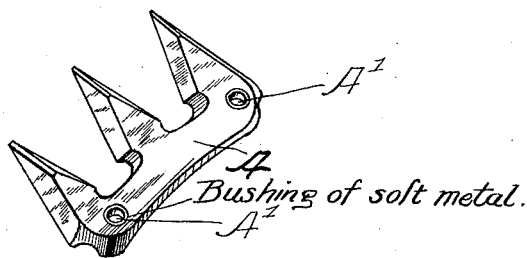
Bushing of soft metal.
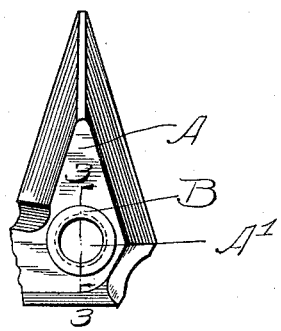
Fig. 2.
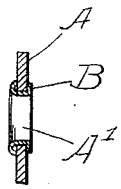
Fig. 3.
Witnesses:
Inventor:
Michael W. McArdle
By Burton & Burton
Attys.

UNITED STATES PATENT OFFICE.

MICHAEL W. McARDLE, OF CHICAGO, ILLINOIS, ASSIGNOR TO CHICAGO FLEXIBLE SHAFT COMPANY, OF CHICAGO, ILLINOIS, A CORPORATION OF ILLINOIS.

CUTTER FOR ANIMAL-SHEARS.

1,019,333. Specification of Letters Patent. Patented Mar. 5, 1912.

Application filed December 1, 1911. Serial No. 663,390.

*To all whom it may concern:*

Be it known that I, MICHAEL W. MC-ARDLE, a citizen of the United States, residing at Chicago, in the county of Cook and State of Illinois, have invented new and useful Improvements in Cutters for Animal-Shears, of which the following is a specification, reference being had to the accompanying drawings, forming a part thereof.

The purpose of this invention is to provide an improved form of oscillating cutter for animal shears.

It consists of the features of construction described and shown in the drawings as indicated in the claims.

In the drawings:—Figure 1 is a perspective view of the cutter embodying this invention. Fig. 2 is an enlarged detail plan view of a portion of the cutter shown in Fig. 1. Fig. 3 is a sectional view taken as indicated at line 3—3 on Fig. 2.

The cutter, A, illustrated in Fig. 1, is in general of the familiar type now almost universally employed in animal shears, being arranged therein for transverse vibratory movement of its three sharpened teeth upon a stationary comb, for the purpose of shearing the wool placed between the teeth of such comb by guidance of the teeth over the body of the animal to be sheared. Preferably, such cutter is made from comparatively thin sheet metal stamped up into shape and subsequently hardened and tempered to secure durability of the cutting edges. In the shearing tool, the vibrating element is constructed with a pair of projecting lugs or pins which engage the two apertures, $A^1$, of the cutter, A, for transmitting the vibratory movement thereto. But when such cutter is formed of thin material and hardened, the pins or projections of the vibratory member are subjected to very rapid wear through their contact with the hardened edges of the apertures, $A^1$, with obviously detrimental results in operation. The improvement which is the subject of this invention consists in lining these edges of the apertures, $A^1$, with softer and less abrasive material in the form of a metal eyelet, B. This eyelet has the familiar form of a hollow cylinder with flanged ends by which it is retained in place in the aperture, $A^1$, of the cutter, A. This arrangement is clearly indicated by Fig. 3, and need not be further described.

I claim:—

1. A cutter for animal shears comprising a die-formed cutting element of sheet metal provided with an aperture adapted to receive the driving pin of a shearing tool, and a bushing of softer material secured in such aperture as a lining for the edge thereof.

2. A cutter for animal shears comprising a die-formed cutting element of hardened sheet metal provided with an aperture adapted to receive the driving pin of a shearing tool, and a bushing of softer metal secured in such aperture as a lining for the edge thereof.

3. A cutter for animal shears comprising a die-formed cutting element of hardened sheet metal provided with an aperture adapted to receive the driving pin of a shearing tool, and an eyelet of softer material positioned in such aperture for lining the edge thereof and formed with flanges clenched against the opposite faces of the material of the cutter.

In testimony whereof, I have hereunto set my hand, at Chicago, Illinois, this 28th day of November, 1911.

MICHAEL W. McARDLE.

Witnesses:
E. CUNNINGHAM,
M. GERTRUDE ADY.

Copies of this patent may be obtained for five cents each, by addressing the "Commissioner of Patents, Washington, D. C."